UNITED STATES PATENT OFFICE.

PHILIP L. SYLVESTER, OF AUBURN, NEW YORK, ASSIGNOR OF ONE-HALF TO WOODRUFF BROS., OF SAME PLACE.

MANUFACTURE OF BUTTONS FROM PLASTIC MATERIAL.

SPECIFICATION forming part of Letters Patent No. 258,502, dated May 23, 1882.

Application filed March 14, 1882. (Specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material; and I do hereby declare that the following is a full, clear, and exact description thereof.

The design of my invention is to produce in an inexpensive manner such ornamentation of the faces of buttons or other articles made from plastic material as may be secured by means of figures formed by shades of colors or by different colors; and to this end it consists in the method of ornamenting the faces of buttons or other articles by first impressing or indenting the desired figure within the surface of a sheet of plastic material from which the same are made, then sprinkling into such indentations or impressions powdered stock having a different color or shade, and finally subjecting said material to the action of heat, substantially as and for the purpose hereinafter specified.

In the use of my method the plastic material is prepared in sheets of suitable size and thickness, and the upper surface of each sheet is impressed with any desired figure or design, the depth of such impressions determining the distinctness and depth of color of the completed design. When ready for use in making buttons a sheet of the prepared material is placed upon a warming-table, and powdered stock, having any desired color or any shade of the color of the body of said sheet, is sprinkled over the surface of the latter and caused to fill the indentations, after which, when sufficiently warm, said sheet is passed through the molds and formed into buttons. The heat and pressure cause the powdered stock to firmly unite with the body of the plastic material, so that the face of the button or other article is smooth and homogeneous, and at the same time retains the figures or design given to the sheet originally, said powdered stock filling and clearly defining the lines formed within the latter. This method affords means whereby an endless variety of ornamental surfaces may be easily produced without materially increasing the cost of the finished button.

Having thus fully set forth the nature and merits of my invention, what I claim as new is—

The method of ornamenting the faces of buttons or other articles by first impressing or indenting the desired figure within the surface of a sheet of plastic material from which the same are made, then sprinkling into such indentations or impressions powdered stock having a different color or shade, and finally subjecting said material to the action of heat, substantially as and for the purpose specified.

In testimony that I claim the foregoing I have hereunto set my hand this 8th day of February, 1882.

PHILIP L. SYLVESTER.

Witnesses:
P. C. WOODRUFF,
A. E. GRANT.